United States Patent
Löhr et al.

(10) Patent No.: US 10,659,992 B2
(45) Date of Patent: May 19, 2020

(54) SWITCHING BETWEEN PACKET DUPLICATION OPERATING MODES

(71) Applicant: Motorola Mobility LLC, Chicago, IL (US)

(72) Inventors: Joachim Löhr, Wiesbaden (DE); Prateek Basu Mallick, Dreieich (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/557,038

(22) Filed: Aug. 30, 2019

(65) Prior Publication Data

US 2020/0068437 A1 Feb. 27, 2020

Related U.S. Application Data

(63) Continuation of application No. 15/953,248, filed on Apr. 13, 2018, now Pat. No. 10,405,231.

(Continued)

(51) Int. Cl.
*H04W 28/06* (2009.01)
*H04W 76/19* (2018.01)
(Continued)

(52) U.S. Cl.
CPC ............ *H04W 28/065* (2013.01); *H04L 1/08* (2013.01); *H04L 1/1874* (2013.01);
(Continued)

(58) Field of Classification Search
CPC ... H04W 28/065; H04W 76/19; H04W 76/27; H04W 36/0066; H04W 76/15; H04W 80/02; H04L 1/1812
See application file for complete search history.

(56) References Cited

U.S. PATENT DOCUMENTS

| 2017/0201603 A1* | 7/2017 | Uchino | ................ H04W 36/02 |
| 2018/0270718 A1* | 9/2018 | Wang | ................ H04W 36/023 |

(Continued)

OTHER PUBLICATIONS

PCT/US2018/029219, "Notification of Transmittal of the International Search Report and the Written Opinion of the International Searching Authority, or the Declaration" International Searching Authority, dated Aug. 16, 2018, pp. 1-12.

(Continued)

*Primary Examiner* — Melvin C Marcelo
(74) *Attorney, Agent, or Firm* — Kunzler Bean & Adamson

(57) ABSTRACT

For switching between packet duplication operating modes, methods, apparatus, and systems are disclosed. One apparatus includes a processor and a transceiver that communicates with a mobile communication network via a radio bearer. The processor determines whether PDCP packet duplication associated with the PDCP protocol entity is to be activated and, if so, communicates with a mobile communication network according to a packet duplication mode of operation. Otherwise, the processor determines whether a split threshold value of the PDCP protocol entity is set to a predefined value, communicates with the mobile communication network according to a first split bearer mode of operation in response to determining that the split threshold value is set to the predefined value, and communicates with the mobile communication network according to a second split bearer mode of operation in response to determining that the split threshold value is not set to the predefined value.

20 Claims, 6 Drawing Sheets

Related U.S. Application Data

(60) Provisional application No. 62/542,284, filed on Aug. 7, 2017, provisional application No. 62/489,332, filed on Apr. 24, 2017.

(51) Int. Cl.
   | | |
   |---|---|
   | *H04W 76/27* | (2018.01) |
   | *H04L 1/08* | (2006.01) |
   | *H04W 36/00* | (2009.01) |
   | *H04L 1/18* | (2006.01) |
   | *H04W 76/15* | (2018.01) |
   | *H04W 80/02* | (2009.01) |

(52) U.S. Cl.
   CPC ....... *H04W 36/0066* (2013.01); *H04W 76/19* (2018.02); *H04W 76/27* (2018.02); *H04L 1/1812* (2013.01); *H04W 76/15* (2018.02); *H04W 80/02* (2013.01)

(56) References Cited

U.S. PATENT DOCUMENTS

| | | | |
|---|---|---|---|
| 2018/0279168 A1* | 9/2018 | Jheng | H04W 28/04 |
| 2018/0288631 A1* | 10/2018 | Wei | H04W 24/02 |

OTHER PUBLICATIONS

Nokia, Alcatel-Lucent Shanghai Bell, "Corrections to handling of uplink split" 3GPP TSG-RAN WG2 Meeting #96, R2-169043, Nov. 14-18, 2016, pp. 1-5.

Nokia, Alcatel-Lucent Shanghai Bell, "Overview of Duplication Operation", 3GPP TSG-RAN WG2 Meeting #97bis, R2-1702632, Apr. 3-7, 2017, pp. 1-2.

Ericsson, "Duplication in UL in Dual connectivity", 3GPP TSG-RAN WG2 #97bis, R2-1702750, Apr. 3-7, 2017, pp. 1-2.

* cited by examiner

SWITCHING BETWEEN PACKET DUPLICATION OPERATING MODES

CROSS-REFERENCE TO RELATED APPLICATIONS

This application claims priority to U.S. patent application Ser. No. 15/953,248 entitled "Switching Between Packet Duplication Operating Modes" and filed on Apr. 13, 2018 for Joachim Löhr, Prateek Basu Mallick, and Ravi Kuchibhotla; and U.S. Provisional Application No. 62/542,284 entitled "Selective Packet Duplication Control" and filed Aug. 7, 2017; and U.S. Provisional Application No. 62/489,332 entitled "Efficient Scheme for Packet Duplication in NR" and filed Apr. 24, 2017, the entire disclosures of each are hereby incorporated by reference.

FIELD

The subject matter disclosed herein relates to electronic communications and more particularly relates to switching between packet duplication operating modes.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Backoff Indicator ("BI"), Bandwidth Part ("BWP"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Convergence Protocol ("PCDP"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information ("SI"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

Packet duplication adds redundant information to transmissions between devices to accommodate for errors during the transmissions. By transmitting duplicate data within the transmission, a transmitting device increases the probability that the corresponding receiving device will successfully receive the data in its entirety. In environments with low transmission reliability, the duplicate data improves the overall data error rate, since it is unlikely the transmissions will corrupt the same set of data in both a first and second instance of the duplicate data. In other words, a receiving device can combine the uncorrupted data from each instance of the duplicate data to successfully receive and extract data. However, in environments with high transmission reliably, the addition of duplicate data can occupy valuable data space and/or add unnecessary overhead to transmissions that are operating without error. Conversely, if the environments with high transmission reliability omit transmitting the duplicate data, it becomes harder for devices operating in the high transmission reliability environment to recover from temporary failures or unanticipated changes.

BRIEF SUMMARY

Methods for switching between packet duplication operating modes are disclosed. Apparatuses and systems also perform the functions of the methods. One method (e.g., of a user equipment) for switching between packet duplication operating modes includes establishing a radio bearer to communicate with at least one network entity, the radio bearer comprising a Packet Data Convergence Protocol ("PDCP") protocol entity associated with a first Radio Link Control ("RLC") protocol entity and with a second RLC protocol entity. The method includes determining whether PDCP packet duplication associated with the PDCP protocol entity is to be activated and communicating with a mobile communication network according to a packet duplication mode of operation in response to determining that PDCP packet duplication is to be activated. The method includes determining whether a split threshold value of the PDCP protocol entity is set to a predefined value in response to determining that PDCP packet duplication is not to be activated, communicating with the mobile communication network according to a first split bearer mode of operation in response to determining that the split threshold value is set to the predefined value, and communicating with the mobile communication network according to a second split bearer mode of operation in response to determining that the split threshold value is not set to the predefined value.

In various embodiments, the first split bearer mode of operation includes selecting one of the first RLC protocol entity and the second RLC protocol entity to be a primary RLC protocol entity and transmitting uplink PDCP data exclusively over a data path associated with the primary RLC protocol entity. In various embodiments, the second split bearer mode of operation comprises includes selecting one of the first RLC protocol entity and the second RLC protocol entity to be a primary RLC protocol entity and selectively sending uplink PDCP data to the primary RLC protocol entity or to a non-primary RLC protocol entity based on an amount of uplink PDCP data as compared to the split threshold value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
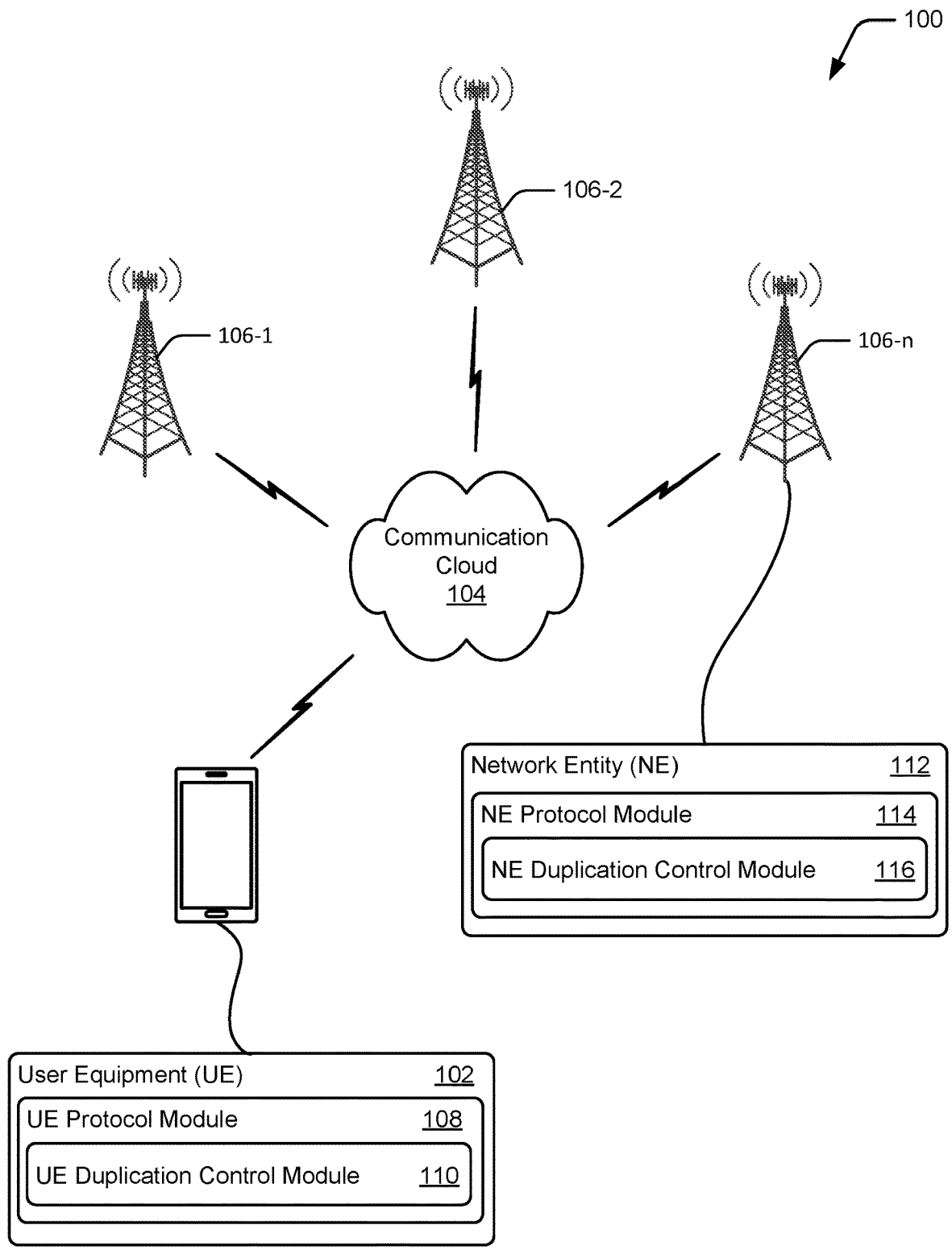
FIG. 1 illustrates an example operating environment in accordance with one or more implementations.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Overview

Various implementations selectively enable and disable packet duplication in a wireless network, such as a wireless network that employs Packet Data Convergence Protocol (PDCP). While features and concepts for selectively enabling and disabling packet duplication can be implemented in any number of different devices, systems, environments, and/or configurations, example implementations are described in the context of the following example devices, systems, and methods.

Example Operating Environment

FIG. 1 illustrates example environment 100 according to one or more implementations. Environment 100 includes user equipment (UE) 102 illustrated as a cellular phone. In environment 100, user equipment 102 includes the capability of communicating over a wireless network, generally indicated here as communication cloud 104. To represent the various components that make up a wireless network, environment 100 generally includes network component 106-1, network component 106-2, and network component 106-$n$, where n is an arbitrary number that indicates a wireless network can include any suitable number of components. Here, each network component is illustrated as a base station that works in conjunction with other network components to provide serving cells (associated with communication cloud 104) to various types of user equipment and/or user devices. Some implementations of user equipment 102 can support simultaneous connections to multiple network components as further described herein.

Communication cloud 104 generally represents any suitable type of wireless network that facilitates a bi-directional link between user equipment, such as user equipment 102, and various network components (e.g., at least one of network component 106-1, network component 106-2, and network component 106-$n$). Communication cloud 104 can include multiple interconnected communications networks that comprise a plurality of interconnected elements, and support any suitable type of wireless network and/or communication system. For instance, in some implementations, communication cloud 104, as supported by the various network components, includes the ability to support Long-Term Evolution (LTE) communications, such as those described with respect to $3^{rd}$ Generation Partnership Project (3GPP) and $4^{th}$ Generation (4G) LTE, $5^{th}$ Generation (5G) technologies, and so forth.

In environment 100, user equipment 102 includes a UE protocol module 108. Here, UE protocol module 108 represents functionality that provides the ability to communicate via communication cloud 104 and/or its various network components using a corresponding wireless networking technology. For example, in the example in which communication cloud 104 supports communications as described by the various LTE communication standards, UE protocol module 108 includes a corresponding LTE protocol stack. For simplicity's sake, UE protocol module 108 is illustrated as a single module, but it is to be appreciated that various combinations of software, firmware, and/or hardware can be used to implement UE protocol module 108. As one example, UE protocol module 108 can include various combinations of software, firmware, control logic, and/or hardware to implement a protocol stack based upon the Open Systems Interconnection (OSI) model that includes multiple layers (e.g., a physical layer, a data link layer, a network layer, etc.). Some implementations additionally partition these various layers. As one example, the data link layer can include a Media Access Control layer (MAC) that controls the various permissions used to govern how user equipment 102 transmits data. As another example, the physical layer of UE protocol module 108 can include hardware used to transmit various electrical signals and/or low-level software access used to configure the hardware. These various layers are then used to communicate data to other protocol stacks as further described herein.

UE protocol module 108 includes UE duplication control module 110. While illustrated as residing within UE protocol module 108, other implementations of UE duplication control module 110 reside outside of UE protocol module 108 such that UE duplication control module 110 controls various aspects of UE protocol module, such as those pertaining to packet duplication. UE duplication control module 110 represents functionality that dynamically and/or selectively enables and disables packet duplication as further described herein. For instance, UE duplication control module 110 can initially set various parameters used by UE protocol module 108 to default values that enable packet duplication. Alternately or additionally, UE duplication control module can receive indications from external entities, such as one of network component 106-1, network component 106-2, and/or network component 106-n, to disable packet duplication as further described herein. While illustrated as a single entity included in UE protocol module 108, it is to be appreciated that UE duplication control module 110 can be implemented in varying combinations of software, firmware, control logic, and/or hardware. Alternately or additionally, UE duplication control module 110 can reside in either a single layer of a corresponding protocol stack of UE protocol module 108, or in multiple layers of the corresponding protocol stack.

In environment 100, network component 106-n includes network entity (NE) 112. Here, network entity 112 represents functionality used to manage communications over communication cloud 104. Thus, in environment 100, network entity 112 can monitor and manage various aspects of how user equipment 102 transmits data over communication cloud 104. To manage and support the various types of devices communicating over communication cloud 104, network entity 112 includes NE protocol module 114 to implement functionality corresponding to a protocol stack. For instance, returning to the example of communication cloud 104 supporting various forms of LTE wireless communications, NE protocol module 114 can include an LTE protocol stack corresponding to a network side device that is complimentary to a protocol stack included in UE protocol module 108 corresponding to user equipment. As one skilled in the art will appreciate, this can include the ability for various layers between the two protocol modules to communicate with one another (e.g., the physical layer corresponding to UE protocol module 108 communicating with the physical layer corresponding to NE protocol module 114, etc.). To manage packet duplication over communication cloud 104, NE protocol module 114 includes NE duplication control module 116.

NE duplication control module 116 represents functionality that can monitor and or manage selective duplication of packets at a user equipment as further described herein. In some implementations, NE duplication control module 116 initiates and/or transmits indications to user equipment 102 (that are subsequently processed by UE duplication control module 110) to selectively enable or disable packet duplication. While illustrated as a single entity included in NE protocol module 114, it is to be appreciated that NE duplication control module 116 can alternately be implemented external to NE protocol module 114. Further, NE protocol module 114 can be implemented in varying combinations of software, firmware, control logic, and/or hardware. As in the case of UE duplication control module 110, NE duplication control module 116 can reside in either a single layer of a corresponding protocol stack of NE protocol module 114, or in multiple layers of the corresponding protocol stack.

Having described an example operating environment that can employ selective packet duplication using PDCP, consider now a discussion of dynamically selecting packet duplication in accordance with one or more implementation.

Dynamic Selection of Packet Duplication

Various aspects of various implementations provide dynamic selection of packet duplication. In some aspects, Packet Data Convergent Protocol (PDCP) protocol for New Radio (NR) supports packet duplication for both U-Plane as well as C-Plane data of a protocol stack in order to increase the reliability of transmissions, i.e. by having the diversity gain during transmissions through different paths. Duplication is a function of the PDCP layer where data, e.g., PDCP Protocol Data Units (PDUs), is duplicated. Services which benefit from duplication are Ultra-Reliable and Low-Latency Communications (URLLC) or Signalling Radio bearers (SRB)s. Transmission reliability and latency enhancements are two key aspects for URLLC (Ultra-Reliable and Low-Latency Communications) services. Redundancy/diversity schemes in Carrier aggregation (CA) scenarios can be used to reach the reliability and latency requirements of URLLC. For URLLC, two independent transmission channels on different carriers might be needed for extreme-reliability cases such as error rates of $10^{-5}$ to $10^{-9}$ within a given latency bound. Duplication based on CA can be seen as a complementary tool for the scheduler to further improve the transmission reliability. It becomes especially interesting in scenarios where reliability on one of the carriers cannot be guaranteed. In these scenarios it is thus beneficial to have further carrier(s) available, for example in situations like a temporary outage/fading dip, or due to unanticipated change or wrong channel state information.

In some aspects, packet duplication can be applied based on Dual Connectivity (DC) architecture, i.e. split bearer operation with PDCP duplication. In a general sense packet duplication can be used together with different diversity schemes involving more than one radio link to serve a UE, e.g. dual-connectivity (DC) and carrier aggregation (CA) based architecture.

In order to reduce the overhead of duplicated transmissions it can be beneficial to activate/deactivate PDCP duplication in a more dynamic manner. Essentially duplication should be limited to those situations where the extra reliability is really needed. PDCP control signaling or MAC control signaling (MAC CE) could be for example used to activate/deactivate PDCP duplication. However, it is not clear, how the procedures for configuring PDCP duplication in a CA as well as DC-based architecture look like and how activating/deactivating duplication in a flexible, dynamic manner is done.

Aspects of various implementations provide efficient activation/deactivation of PDCP duplication for both CA and DC-based architectures. As an example, various implementations provide support for the following new procedures:

1. DC and CA modes of operation: Support of split bearer with duplication mode and use of MAC CE to turn on and off duplication. Handling of RLC entity and buffer stats reporting for duplication mode. Identification of RLC entity to use for when the split bearer operates in non-duplication mode respectively in response to duplication being turned off. Setting of parameters such as ul-DataSplitThreshold. Split bearer can operate in multiple modes: split bearer for throughput improvement, split bearer with single link active or split bearer with duplication mode activated.
2. A new duplication bearer type is proposed for support of duplication. This bearer type uses MAC CE to turn on and off duplication. In case duplication is deactivated one of the legs is not active or suspended.

3. For both above modes of operation new behavior for PDCP/RLC protocols are proposed to handle PDCP duplication.
4. Procedures for reconfiguration of a duplication bearer to a split bearer are proposed.
5. Procedures for reconfiguration of a duplication bearer to a MCG/SCG bearer supporting a single radio link are proposed.
6. Support for UL PDCP link switching is introduced.

Figure 2:
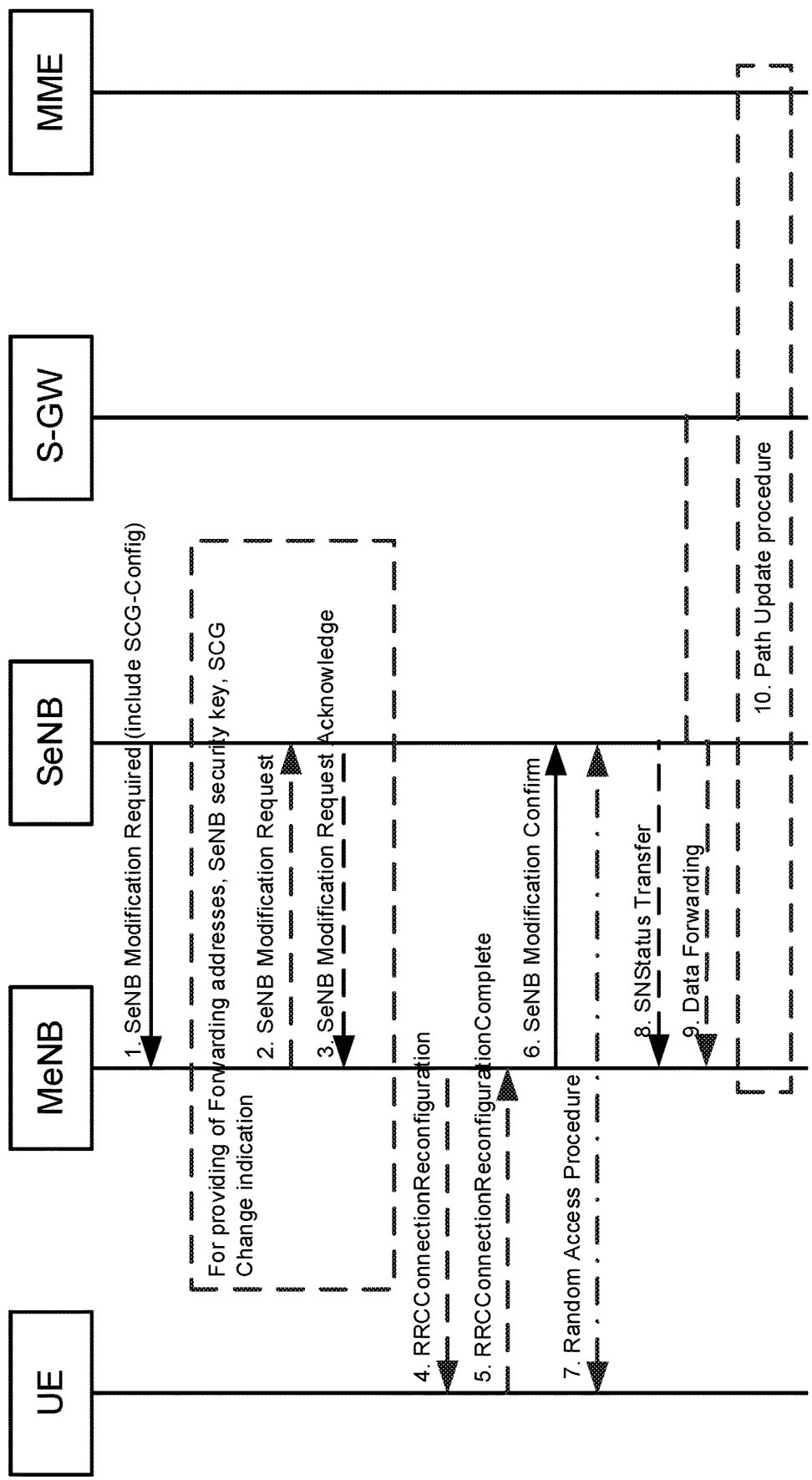
FIG. 2 is a bounce diagram that illustrates various interactions between entities in accordance with one or more implementations.

In a DC based scenario, the activation and/or deactivation of PDCP duplication can be achieved by the legacy bearer reconfiguration procedures. For example, in deactivating duplication and using only a single radio link, the network could perform a split bearer to MCG bearer reconfiguration. However, a bearer reconfiguration procedure is a complex procedure involving a significant amount of signaling, e.g. including a data recovery procedure, at the expense of an increased delay as shown in the figure below. Therefore, this procedure might not be suitable for activating/deactivating PDCP duplication in a dynamic manner. To further demonstrate, consider FIG. 2 that illustrates a bounce diagram with example interactions and messages that can be sent between entities.

Table 1 includes a list of abbreviations and/or definitions used in the following discussion:

TABLE 1

| Abbreviation | Description/Definition |
| --- | --- |
| Non-split bearer | a bearer whose radio protocols are located in either the MgNB or the SgNB to use MgNB or SgNB resource, respectively. |
| Split bearer | in dual connectivity, a bearer whose radio protocols are located in both the MgNB and the SgNB to use both MgNB and SgNB resources. |
| BSR | Buffer status report |
| eNB | Evolved Node-B |
| gNB | 5G Node-B |
| GPRS | General Packet Radio Service |
| GSM | Global System for Mobile Communications |
| MN | Master Node |
| SN | Secondary Node |
| DRB | Data Radio Bearer carrying user plane data |
| MCG | Master Cell Group |
| MME | Mobility Management Entity |
| L2 | Layer 2 (data link layer) |
| L3 | Layer 3 (network layer) |
| MAC | Medium Access Control |
| NR | New Radio |
| PDCP | Packet Data Convergence Protocol |
| PDU | Protocol Data Unit |
| RB | Radio Bearer |
| RLC | Radio Link Control |
| RRC | Radio Resource Control |
| SCG | Secondary Cell Group |
| SIB | System Information Block |
| SR | Scheduling Request |
| SRB | Signaling Radio Bearer |
| SDU | Service Data Unit |
| SN | Sequence Number |
| SRB | Signalling Radio Bearer carrying control plane data |
| TCP | Transmission Control Protocol |
| UE | User Equipment |
| UICC | Universal Integrated Circuit Card |
| UMTS | Universal Mobile Telecommunication System |
| UP | User Plane |

In the following the term eNB/gNB is used for the base station but it is replaceable by any other radio access node, e.g. BS, eNB, gNB, AP, NR etc. Further the proposed method is applicable also to other types of networks including IEEE 802.11 variants, GSM, GPRS, UMTS, LTE variants, CDMA2000, Bluetooth, ZigBee, Sigfoxx, etc. The described solution is also applicable to the Next Generation Mobile Network (see 3GPP TS 23.501 and 3GPP TS 23.502) where the nodes MME map to AMF and SMF and the HSS maps to UDM/UDR and SGW/PGW map to the UPF.

Split Bearer with Duplication Mode

In one or more implementations, UE is configured by a network entity (NE) such as a base station (BS) or gNodeB (gNB) or the like with a split bearer, i.e. a radio bearer in a dual connectivity scenario whose radio protocols are split at either the master node (MN) or the secondary node (SN) and belong to both MCG and SCG. NE or gNB can configure the split bearer to use either the split bearer operation as defined for 5G (for throughput enhancement), to use only one link/logical channel (by a specific configuration like setting ul-DataSplitThreshold to a predefined value) or to use the PDCP packet duplication mode.

The radio bearer configuration of the split bearer, e.g. PDCP configuration, contains an information element (IE) indicating whether packet duplication is configured or not for the split bearer. In one or more implementations, this information element is a Boolean variable. In case the variable is set to false no packet duplication is supported for this split bearer, i.e. legacy split bearer operation (for throughput enhancement) is supported. In case the Boolean variable is set to true packet duplication is configured for the split bearer. In this example, duplication is an additional specific mode of the split bearer.

NE like gNB can dynamically activate/deactivate duplication for a split bearer configured for duplication (Boolean set to True) by means of a MAC CE. According to one or more implementations, the default state for a split bearer configured for duplication is that duplication is deactivated, i.e. duplication needs to be explicitly activated by a MAC CE.

In response to deactivation of duplication, regular split bearer operation (as defined for 5G) is performed. UE follows the configured parameters for the split bearer like ul-DataSplitThreshold and ul-DataSplitDRB-ViaSCG Information Elements (IE) in order to determine the data routing and buffer status reporting behaviour of the mobile, i.e. determine whether UE sends UL PDCP data via SCG or MCG of a configured split bearer or both. According to one or more implementations, ul-DataSplitThreshold is set to a new predefined value for a split bearer, e.g. infinity, in order to configure that only one leg/radio link/logical channel/RLC entity is used for UL PDCP data transmission. According to another alternative implementation, ul-DataSplitThreshold is not configured, hence all PDCP data is submitted to one RLC entity as configured by an IE, e.g. ul-DataSplitDRB-ViaSCG.

In such a case the UE flushes according to another implementation the RLC transmission buffer of the "inactive" RLC entity, i.e., RLC entity of inactive/deactivated radio link. Flushing the PDCP PDUs/RLC PDUs stored in the transmission buffer ensures that those PDUs are not retransmitted, once the radio link is reactivated (in response to activating duplication again), since this might even lead to TCP reducing the link rate or to HFN desynchronization. According to another implementation the RLC entity of the "inactivated" radio link is re-established in response to deactivating duplication.

In another implementation UE initializes Bj for a previously "inactive" logical channel to zero in response to duplication being activated again. Alternatively, the Bj is initialized to zero for an "inactive" logical channel in response to duplication being deactivated. The MAC entity maintains a variable Bj for each logical channel j. Bj shall be initialized to zero in response to the related logical channel being established, and incremented by the product PBR×TTI duration for each TTI, where PBR is Prioritized Bit Rate of logical channel j. The UE doesn't maintain the bucket status of a "inactive" logical channel in response to duplication being deactivated. In one or more implementations, UE cancels, if any, pending triggered Scheduling Request/buffer status reporting procedures caused by data arrival of the "inactivated" logical channel in response to duplication being deactivated.

In one or more implementations, the RLC entity of the inactive radio link/cell group respectively one leg of the split bearer is suspended in response to deactivating duplication. MAC entity does not report buffer status information for the suspended leg of the split bearer. Furthermore, the UE will flush the RLC buffer or alternatively re-establish the "suspended" RLC entity.

In one or more implementations, the MAC/HARQ entity discards packets which are received for a RLC entity of an inactive leg of a split bearer in response to duplication having a deactivated state. RLC PDUs of an "inactive" RLC entity/logical channel might be still subject to HARQ retransmission and therefore arrive after having disabled duplication.

According to one or more implementations, in response to duplication being activated by MAC CE, ul-DataSplit-Threshold is set to zero (implicitly by UE or explicitly signaled by gNB), which ensures that both links are used for UL PDCP data transmission and PDCP packet (PDU) duplication is applied. PDCP PDUs are generated upon request from lower layers, i.e. based on UL grant reception, and duplicated. In one or more implementations, the PDCP PDUs are delivered to both RLC entities. Details about the UE behaviour for PDCP packet duplication is disclosed in further implementations.

According to another implementation in response to duplication being activated by MAC CE, ul-DataSplit-Threshold, ul-DataSplitDRB-ViaSCG Information Elements (IEs) are ignored by the UE and packet duplication is applied. PDCP PDUs are generated upon request from lower layers, i.e. based on UL grant reception, and duplicated. In one or more implementations, the PDCP PDUs are delivered to both RLC entities. Details about the UE behaviour for PDCP packet duplication is disclosed in further implementations.

According to another implementation in response to receiving a reconfiguration message for a split bearer for which duplication is configured, e.g. RRC reconfiguration message, indicating that duplication is de-configured, e.g. Boolean variable set to false, UE PDCP applies legacy split bearer operation, e.g. applying ul-DataSplitThreshold and ul-DataSplitDRB-ViaSCG IEs as configured. The RLC, MAC protocol is continued without any interruption, e.g. RLC transmissions are continued, HARQ operation is continued. UE compares the data available for transmission in PDCP layer against the configured threshold ul-DataSplit-Threshold and performs the routing to lower layers and buffer status reporting accordingly as for the legacy split bearer operation. According to one or more implementations, each RLC entity/LCH of the split bearer may have, during duplication, a separate PDCP data volume (the amount of PDCP data available for transmission may be different for the two LCHs). In response to de-configuring the duplication for the split bearer, the UE PDCP uses the smaller of the two PDCP data volumes for comparison against the configured threshold for the purpose of routing and buffers status reporting.

According to a further implementation the PDCP receiver triggers and sends a PDCP status report indicating the successfully received PDCP SDUs to the PDCP transmitting entity. The PDCP transmitter may in response to receiving the PDCP status report update its transmission buffer in order to avoid (re)transmitting PDCP SDUs which were already successfully received.

To further illustrate, consider Table 2 that illustrates the activation and deactivation of duplication relative to various settings as indicated below:

TABLE 2

| | Duplication activated | Duplication deactivated |
|---|---|---|
| Duplication configured | ul-DataSplitThreshold = 0 or ul-DataSplitThreshold and ul-DataSplitDRB-ViaSCG are ignored | split bearer operation. UE follows ul-DataSplitThreshold and ul-DataSplitDRB-ViaSCG or ul-DataSplitThreshold = infinity (single link) or ul-DataSplitThreshold is not configured |
| Duplication not configured | split bearer operation. UE follows ul-DataSplitThreshold and ul-DataSplitDRB-ViaSCG | |

Split Bearer with New Configuration, Indicating the Duplication RLC Entity/Leg

In one or more implementations, UE is configured by a network entity (NE) such as a base station (BS), gNodeB (gNB) or the like with a split bearer, i.e. a radio bearer in a dual connectivity scenario whose radio protocols are split at either the master node (MN) or the secondary node (SN) and belong to both MCG and SCG. The radio bearer configuration, i.e. PDCP configuration, of the split bearer contains an information element (IE) indicating whether packet duplication is configured or not. In one or more implementations, this information element is a Boolean variable.

In case the variable is set to false indicating that packet duplication is not configured for this split bearer, i.e. split bearer operation is supported.

In case the Boolean variable is set to true indicating packet duplication is configured for the split bearer, the UE (PDCP layer) ignores the IEs ul-DataSplitThreshold, ul-DataSplitDRB-ViaSCG.

There is a new information element (IE), e.g. in PDCP-configuration, configured for the split bearer configuring the RLC entity/link/LCH to use during a deactivated state of duplication, e.g. configuring which of the two RLC entities to use in response to a deactivated duplication state. This information element can be used in response to the split bearer being configured for duplication.

NE like gNB can dynamically activate/deactivate duplication for a split bearer configured for duplication (Boolean set to True) by means of a MAC CE. According to one or more implementations, the default state for a split bearer configured for duplication is that duplication is deactivated, i.e. duplication needs to be explicitly activated by a MAC CE.

According to one or more implementations, in response to duplication being deactivated, the RLC entity configured via the new IE is used for uplink PDCP data transmission. PDCP will only submit PDCP PDUs to the configured RLC entity. In one or more implementations, UE continues to report buffer status information for the "inactive" RLC entity/LCH. The amount of data in PDCP for the purpose of buffer status reporting/PDCP data volume is set to zero for the inactive LCH/RLC entity. In another implementation UE doesn't report buffer status information for the "inactive" RLC entity/LCH.

According to one or more implementations, in response to duplication being activated by MAC CE, ul-DataSplitThreshold and ul-DataSplitDRB-ViaSCG IEs are ignored by the UE and packet duplication is applied. PDCP PDUs are generated upon request from lower layers, i.e. based on UL grant reception, and duplicated. In one or more implementations, the PDCP PDUs are delivered to both RLC entities. Details about the UE behaviour for PDCP packet duplication is disclosed in further implementations.

According to another implementation in response to receiving a reconfiguration message for a split bearer for which duplication is configured, e.g. RRC reconfiguration message, indicating that duplication is de-configured, e.g. Boolean variable set to false, UE PDCP applies ul-DataSplitThreshold and ul-DataSplitDRB-ViaSCG IEs as configured. ul-DataSplitThreshold and ul-DataSplitDRB-ViaSCG are examples used to demonstrate how the related functions for data routing and/or BSR purposes can be dynamically configured, and it is to be appreciated that alternate or additional IEs and/or information can be applied and/or utilized without departing from the scope of the claimed subject matter. The RLC, MAC protocol is continued without any interruption, e.g. RLC transmissions are continued, HARQ operation is continued. UE compares the data available for transmission in PDCP layer against the configured threshold ul-DataSplitThreshold and performs the routing to lower layers and buffer status reporting accordingly. According to one or more implementations, each RLC entity/LCH of the split bearer may have, in response to performing duplication, a separate PDCP data volume (the amount of PDCP data available for transmission may be different for the two LCHs). In response to de-configuring the duplication for the split bearer, the UE PDCP uses the smaller of the two PDCP data volumes for comparison against the configured threshold for the purpose of routing and buffers status reporting.

According to a further implementation the PDCP receiver triggers and sends a PDCP status report indicating the successfully received PDCP SDUs to the PDCP transmitting entity. The PDCP transmitter may in response to receiving the PDCP status report update its transmission buffer in order to avoid (re)transmitting PDCP SDUs which were already successfully received.

To further illustrate, consider Table 3 that illustrates the activation and deactivation of duplication relative to various settings as indicated below:

TABLE 3

| | Duplication activated | Duplication deactivated |
|---|---|---|
| Duplication configured | Packet duplication is applied. ul-DataSplitThreshold and ul-DataSplitDRB-ViaSCG are ignored | UE transmits UL PDCP data only via configured LCH/RLC entity ul-DataSplitThreshold and ul-DataSplitDRB-ViaSCG are ignored |
| Duplication not configured | split bearer operation. UE follows ul-DataSplitThreshold and ul-DataSplitDRB-ViaSCG | |

New Bearer, i.e. Duplication Bearer, which can be Used for CA and DC

According to one further implementation a new bearer type is introduced, i.e. duplication bearer, in order to support PDCP packet duplication. A duplication bearer is characterized by having one PDCP entity and two associated RLC entities. In contrast to a split bearer, no PDCP parameters for split bearer operation like ul-DataSplitThreshold, ul-DataSplitDRB-ViaSCG IEs are configured for a duplication bearer. Furthermore, a duplication bearer could be used in a dual connectivity scenario, i.e. UE is configured with two cell groups, and also for the case of carrier aggregation, i.e. UE is configured with multiple serving cells/component carriers controlled by one NE like gNB.

A duplication bearer is configured with a parameter indicating which RLC entity/logical channel/link/cell group is used in case duplication is deactivated. The duplication bearer is generally applicable to signalling data (SRB) as well as user plane data (DRB).

According to one or more implementations, duplication is activated/deactivated by means of MAC control signalling for a duplication bearer. The default state for a duplication bearer is that duplication is deactivated.

According to one or more implementations, in response to duplication being deactivated by MAC CE, the configured RLC entity/LCH is used for uplink PDCP data transmission. PDCP will only submit PDCP PDUs to the configured RLC entity. According to one or more implementations, UE continues operation of the other "inactive" RLC entity, i.e. RLC (re)transmissions are continued after duplication has been deactivated until buffers are empty. The data available for transmission in PDCP/PDCP data volume for the "deactivated" logical channel/RLC entity is set to zero, i.e. UE only reports RLC data volume/buffer information.

According to another implementation in response to receiving an indication from NE directing the UE to deactivate duplication, the UE flushes the RLC transmission buffer of the deactivated RLC entity, i.e. RLC entity/logical channel which is not used for data transmission as indicated by configuration. The data available for transmission in PDCP for the "deactivated" logical channel/RLC entity is set to zero or alternatively MAC does not report buffer status information for the deactivated RLC entity/logical channel at all. According to another implementation the UE re-establishes the RLC entity which is not used for data transmission.

According to another implementation, the UE suspends the logical channel/RLC entity which is not used for data transmission in response to the NE directing the UE to deactivate duplication. MAC entity does not report buffer status information for the suspended logical channel. UE further re-establish the RLC entity of the suspended logical channel or alternatively flushes the RLC buffer.

In another implementation UE initializes Bj for the previously "inactive"/suspended logical channel to zero in response to duplication being activated. Alternatively, the Bj is initialized to zero for an "inactive" logical channel in response to duplication being deactivated. The MAC entity maintains a variable Bj for each logical channel j. Bj shall be initialized to zero in response to the related logical channel being established, and incremented by the product PBR×TTI duration for each TTI, where PBR is Prioritized Bit Rate of logical channel j. The UE doesn't maintain the bucket status of a "inactive"/suspended logical channel in response to duplication being deactivated. In one or more implementations, UE cancels, if any, triggered Scheduling Request procedures/buffer status reporting procedures caused by data arrival of the "inactivated"/suspended logical channel in response to duplication being deactivated.

In one or more implementations, the MAC entity discards packets which are received for a RLC entity which is suspended or "inactive" in response to duplication being deactivated. RLC PDUs of an "inactive" RLC entity/logical channel might be still subject to HARQ retransmission and therefore arrive after having disabled duplication.

According to one or more implementations, in response to duplication being activated by MAC CE, Packet duplication is applied. PDCP PDUs are generated upon request from lower layers, i.e. based on UL grant reception, and duplicated. In one or more implementations, the PDCP PDUs are delivered to both RLC entities. Details about the UE behaviour for PDCP packet duplication is disclosed in further implementations.

To further illustrate, consider Table 4 that illustrates the activation and deactivation of duplication relative to the duplication bearer:

TABLE 4

| | Duplication activated | Duplication deactivated |
|---|---|---|
| Duplication bearer configured | Packet duplication is applied. | UE transmits UL PDCP data only via configured LCH/RLC entity |

Detailed UE Behavior for PDCP Packet Duplication

According to one or more implementations, in response to duplication being activated by MAC CE, packet duplication is applied. PDCP PDUs are generated upon request from lower layers, i.e. based on UL grant reception, and duplicated. In one or more implementations, the PDCP PDUs are delivered to both RLC entities. Details about the UE behaviour for PDCP packet duplication is disclosed in further implementations).

In response to duplication being configured and activated, PDCP layer generates PDCP PDUs upon request from an associated RLC entity, e.g. in response to the UL grant being received. In one or more implementations, the PDCP layer duplicates the generated PDCP PDUs and submits the PDUs immediately to both RLC entities, even though only one of the two associated RLC entities might have requested new PDCP data. Pushing down the PDCP PDUs immediately to both RLCs may lead to that some data being stuck in an RLC for which no grant will arrive (for some time). However, on the other hand, the advantage would be that PDCP layer doesn't need to keep track which PDCP PDUs have been already submitted to a RLC entity. PDCP operation would be same as for a non-duplication bearer. Also, the PDCP buffer status, i.e. data volume in PDCP for the purpose of buffer status reporting is the same for both RLC entities.

In order to avoid that PDCP PDUs for which successful delivery has been already confirmed for one link/logical channel are subject to a duplicate-transmission over the other link/logical channel, the UE shall according to one or more implementations, discard those packets. According to one or more implementations UE removes PDCP PDUs from transmission buffer of one radio link respectively RLC entity which were already successfully transmitted via the other logical channel/RLC entity based on received RLC status reports. RLC layer will inform PDCP layer about the successfully transmitted PDCP SDUs. PDCP layer will send the PDCP discard notification to the other RLC entity. Hence a new additional trigger for the PDCP discard notification is introduced. In addition to the expiry of the discard timer, the UE PDCP shall trigger discard notification to a RLC entity for a duplication bearer upon confirmation of successful transmission of PDCP PDUs/SDUs over the other RLC entity/logical channel.

In another implementation the removal/discarding of packets is based on received PDCP status reports. For DL the UE would need to send PDCP status reports to the NE, which could use this information for discarding packets which have been already successfully received by the UE from the buffer. For UL the UE PDCP layer indicates in response to having received a PDCP status report the RLC entity to discard packets which have been already successfully transmitted—via the other RLC entity/logical channel. In one or more implementations, the UE let the PDCP discard timer expire for those PDCP SDUs which are indicated in the PDCP status report as successfully transmitted respectively received. Hence a new additional trigger for the PDCP discard notification is introduced. The UE PDCP shall trigger discard notification to a RLC entity for a bearer operating in duplication mode upon confirmation of successful transmission of PDCP PDUs/SDUs over the other RLC entity/logical channel.

In another implementation in response to duplication being configured and activated, PDCP layer only submits generated PDCP PDUs to lower layers upon request. PDCP PDUs are generated and stored in the PDCP layer, i.e. PDCP (re)transmission buffer. In case only one of the RLC entities requests new PDCP PDUs (based on a received grant) for transmission the generated PDCP PDUs are only submitted to the requesting RLC entity. Upon request from the second RLC entity the PDCP PDUs are submitted to the second RLC entity. According to this implementation the PDCP layer maintains two state variables one for each of the two associated RLC entities. Each state variable points to the last submitted PDCP SDU/PDU (submitted to the corresponding RLC entity). In maintaining two state variables/pointers, the PDCP layer is aware of which PDCP SDU/PDU needs to be submitted to the corresponding RLC entity upon request. Since the request rate and size is different for the two RLC entities, e.g. UL grants arrives at different point of times and may be of different size, there need to be two independent state variables. According to one or more implementations, PDCP PDUs are stored in the PDCP layer until the corresponding PDCP PDU has been submitted to both RLC entities. According to another implementation the PDCP PDU stored in PDCP layer can be discarded upon successful delivery confirmation, i.e. successful PDCP PDU transmission over one link, the PDCP PDUs shall not be transmitted again via the other link. Each of the two LCHs has a different PDCP data volume (i.e. amount of PDCP data for the purpose of buffer status reporting) according to one or more implementations, since each LCH has a different PDCP status as further described herein.

Reconfiguration from Duplication Bearer to Regular Split Bearer

According to one or more implementations, in response to receiving a message indicating the reconfiguration from a duplication bearer to a split bearer, UE reconfigures the PDCP entity in accordance with the indicated configuration of the split bearer, i.e. PDCP-Config (ul-DataSplitThreshold, ul-DataSplitDRB-ViaSCG). Similarly, the UE reconfigures the RLC entities and/or the corresponding logical channels in accordance with the RLC-Config and logicalChannelConfig. The RLC, MAC protocol is continued without any interruption, e.g. RLC transmissions are continued, HARQ operation is continued. UE PDCP compares the data available for transmission in PDCP layer against the configured threshold ul-DataSplitThreshold and performs the routing to lower layers and buffer status reporting accordingly. According to one or more implementations, each RLC entity/LCH of the split bearer may have, in response to performing duplication, a separate PDCP data volume calculation (the amount of PDCP data available for transmission may be different for the two LCHs). In response to reconfiguring the bearer type from a duplication bearer to a split bearer, the UE PDCP uses the smaller of the two PDCP data volumes for comparison against the configured threshold for the purpose of routing and buffers status reporting.

According to one or more implementations the UE triggers a PDCP status report (indicating which PDCP SDUs have been successfully received) in response to receiving a receiving a bearer reconfiguration message (duplication bearer to split bearer). In another implementation the UE receives a PDCP status report, e.g. together with the bearer reconfiguration message, and acts upon the received PDCP status report, i.e. PDCP PDUs/SDUs confirmed to be successfully received are removed from the corresponding PDCP/RLC (transmission) buffer.

Reconfiguration from Duplication Bearer to Non-Split Bearer

According to one or more implementations, bearer type reconfiguration from a duplication bearer to a non-split bearer, i.e. one PDCP entity associated with only one RLC entity is supported. In response to receiving a message indicating the reconfiguration of duplication to a MCG or SCG bearer, the UE according to one or more implementations, releases one RLC entity of the two RLC entities and the corresponding logical channel as indicated in the reconfiguration message. The MAC layer operation continues, i.e. no reset of MAC layer. Packets of the removed LCH are discarded upon receipt, i.e. packets from the removed LCH might be still subject to HARQ (re)transmissions. Before removing the RLC entity, RLC informs PDCP layer about the PDCP PDUs/SDUs for which successful reception was confirmed. Alternatively, a PDCP status report is triggered and transmitted in response to the bearer type reconfiguration. BSR/Scheduling request(s) triggered due to data arrival in the LCH which is to be removed are cancelled when pending upon the reconfiguration. Alternatively, the BSR/SR procedures are not affected by the removal of a LCH/RLC entity and continue.

Indication of RLC Reaching the Maximum Number of Retransmissions to gNB

According to one or more implementations, the UE informs the gNB that the maximum number of RLC retransmissions is reached for a logical channel of a bearer which is operated in duplication mode. For the case that PDCP duplication is used in a carrier aggregation scenario, i.e. UE is configured with multiple component carriers/serving cells, the logical channel prioritization procedure ensures that duplicate PDCP PDUs are sent on different carriers. In one or more implementations, the NE like gNB configures which carrier/serving cell the logical channels of a bearer applying PDCP duplication, e.g. a duplication bearer or a split bearer operating in duplication mode, are allowed to use transmission. Since the duplicates are sent on a different carrier always, the failure of that carrier, i.e. upon reaching the maximum number of RLC retransmission, should lead to a deactivation or removal of that carrier/serving cell or reconfiguration of the cell group, but not to a Radio link failure (RLF) like in LTE.

According to one or more implementations, the UE triggers a serving cell failure information procedure in response to a logical channel of a bearer applying PDCP duplication reaches the maximum number of RLC retransmissions. The purpose of this procedure is to inform the NE/gNB about a serving cell failure the UE has experienced, so that network/gNB can deactivate or remove for example the serving cell/carrier where the failure was experienced. According to one or more implementations, the UE stops all uplink transmissions on the cell/carrier where a failure occurred, i.e. maximum number of RLC retransmissions was reached.

UL PDCP Link Switching

For NR, some mode of operating an UL split bearer operation may be to use only one Cell group/link at a time for uplink data transmission and switch the link depending on e.g., channel status, traffic load etc. UL link switching may be beneficial to support fast recovery for most eMBB applications. In NR Dual connectivity and in EN-DC architecture, the UL split bearer may be used in most cases for fast recovery, e.g. the LTE leg is used as a backup leg and the NR leg is used for most transmissions, e.g. the NR SCG may have a large bandwidth. In this case, the NR SCG throughput is sufficient to support eMBB service requirements. LTE MCG may be useful as a backup link for data recovery in response to the NR SCG experiencing a blockage, i.e. in a millimeter wave band.

UL link switching could be configured and operated for a split bearer as well as for a duplication bearer. In the case that the split bearer architecture is used to support UL switching, the split bearer is configured with an additional switching mode, i.e. IE indicating that UL link switching is configured. According to one or more implementations, a split bearer could be operated in three different modes, i.e. split mode, duplication mode and switching mode. In case a duplication bearer (as disclosed in above implementations) UL switching could be supported by changing the configured link which is used for the case in response to duplication being deactivated, i.e. switching the configured UL by RRC reconfiguration. Alternatively, a new parameter/IE could be introduced for a duplication bearer, which indicates that the bearer is configured for the switching mode.

According to one or more implementations, in response to receiving control signaling indicating the switch of the UL link/direction from one RLC entity to the other RLC entity, the UE sets the data volume/data available for transmission in the PDCP layer to zero for the link which is not used for UL PDCP data transmission. UE only reports RLC data volume/buffer occupancy for this LCH/link in the buffer status report.

According to one or more further implementation, in response to receiving control signaling indicating the switch of the UL link/direction from one RLC entity to the other RLC entity, the UE (re)transmits RLC PDUs pending for initial transmission (preprocessed PDCP PDUs) in the RLC entity which was used for UL PDCP data transmission before the link switch via the other RLC entity. According to one or more implementations, upon a UL link switch only RLC retransmissions and RLC status reports are send via the "inactive" RLC entity/LCH, i.e. the RLC/LCH which is not used for PDCP UL data transmissions.

Upon reception of the control signaling indicating a link switch, the UE routes according to one or more implementations, all PDCP PDUs to the RLC entity/logical channel of the indicated link. According to one or more implementations, the RLC entity of the leg/link which was used before the signaled link switch indicates to the PDCP entity the RLC SDUs which were not yet acknowledged, e.g., by RLC status report. The UE retransmits the not yet acknowledged RLC SDUs via the new link used for uplink data transmission, i.e. link indicated in the PDCP control PDU or MAC CE.

According to one or more implementations, the UE flushes the RLC transmission buffer and resets the RLC transmission state variables. In one or more implementations, the RLC entity of the deactivated link, e.g., link which was previously used for uplink data transmission, is reestablished.

According to one or more implementations, the network entity sends a PDCP status report for the split bearer together with the indication to configure/switch the link for uplink PDCP PDU transmission. According to a further implementation, the UE upon reception of the PDCP status report retransmits the PDCP SDUs not yet acknowledged by the network entity via the link/leg indicated to be used for uplink data transmission. In one or more implementations, the UE flushes the RLC transmission buffer and resets the RLC transmission state variables of the leg which is not used for uplink data transmission. In one or more implementations, the RLC entity of the deactivated link is reestablished.

Figure 3:
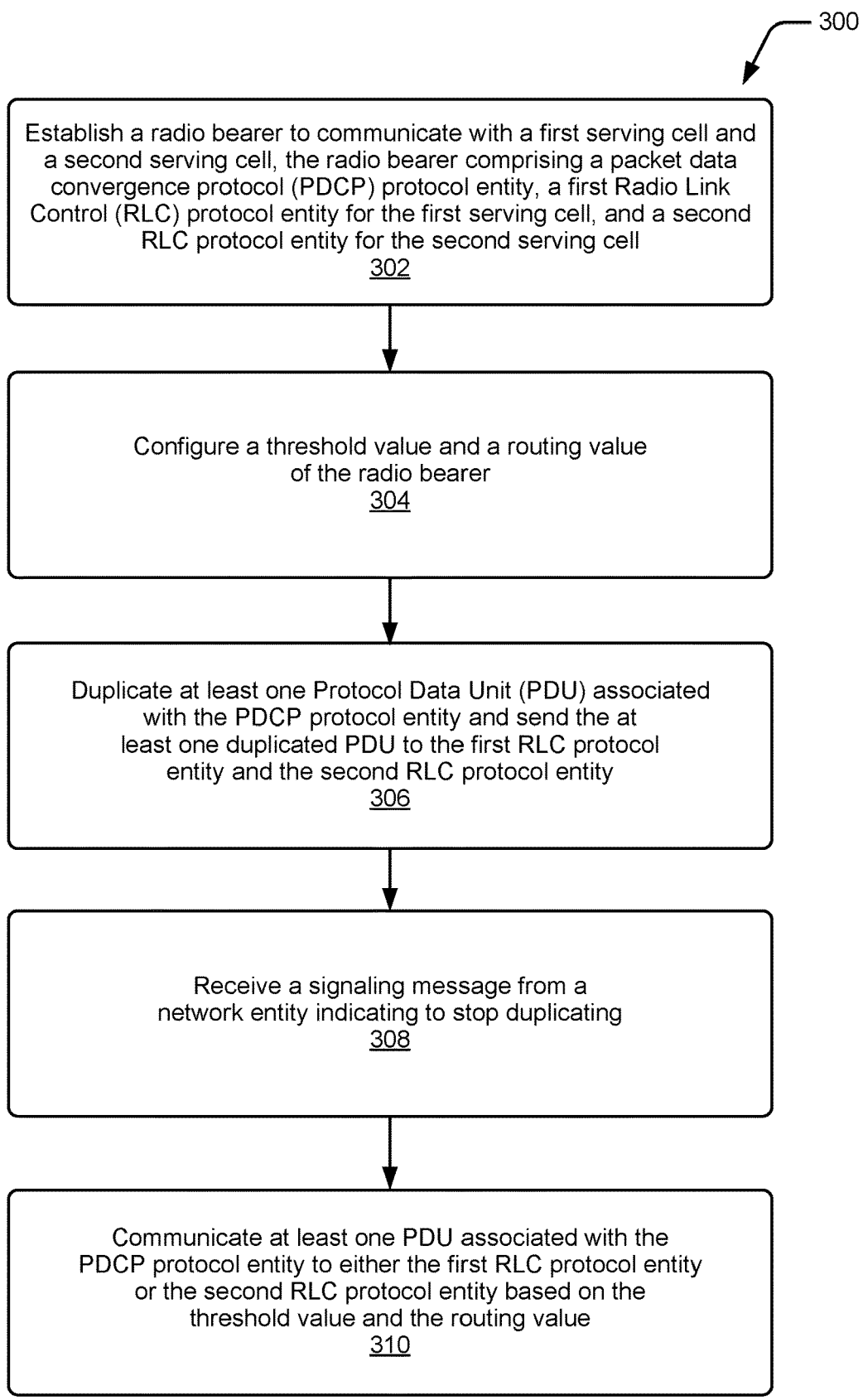
FIG. 3 is an example flow diagram that illustrates operations of selectively controlling packet duplication at user equipment in accordance with one or more implementations.

Now consider FIG. 3 that illustrates an example method 300 that operates in a plurality of operating modes associated with packet duplication in accordance with one or more implementations. Generally, any services, components, modules, methods, and/or operations described herein can be implemented using software, firmware, hardware (e.g., fixed logic circuitry), manual processing, or any combination thereof. For instance, method 300 can be performed by UE protocol module 108 and/or UE duplication control module 110 of FIG. 1. Some operations of the example method may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 300 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 302, user equipment establishes a radio bearer that can be used to communicate with a first serving cell and a second serving cell via the various network components (network component 106-1, network component 106-2, and/or network component 106-n of FIG. 1). In various implementations, the radio bearer can include a PDCP protocol entity, a first radio link control (RLC) protocol entity for the first serving cell, and a second RLC protocol entity for the second serving cell.

At block 304, the user equipment configures a threshold value and a routing value, e.g. a parameter indicating one of the multiple radio link control (RLC) protocol entities, of the radio bearer.

At block 306, the user equipment duplicates at least one Protocol Data Unit (PDU) associated with the PDCP protocol entity, and sends the at least one PDCP PDU and the duplicate PDCP PDU to the first RLC protocol entity, and to the second RLC protocol entity.

At block 308, the user equipment receives a signaling message from a network entity indicating to stop duplicating, such as the duplicating occurring at block 306.

At block 310, and responsive to receiving the indication, the user equipment submits at least one PDU associated with the PDCP protocol entity to either the first RLC protocol entity or the second RLC protocol entity, based on the configured threshold value and the routing value. In various implementations, the at least one PDU is sent to one of the RLC protocol entities without duplication.

Figure 4:
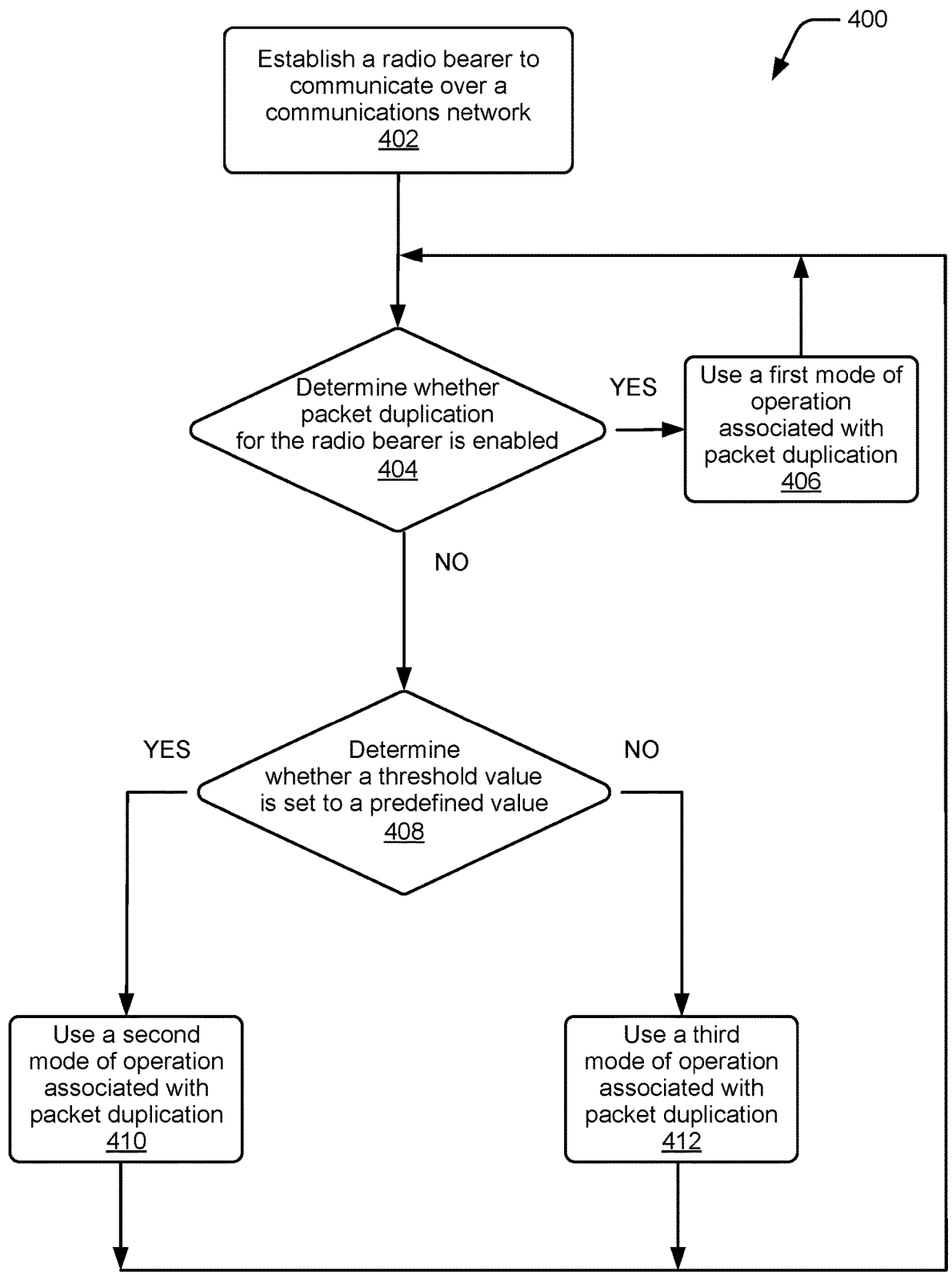
FIG. 4 is an example flow diagram that illustrates operations of selectively switching between modes of operation in accordance with one or more implementations.

As another example, consider now FIG. 4 that illustrates an example method 400 that uses different packet duplication operating modes in accordance with one or more implementations. Generally, any services, components, modules, methods, and/or operations described herein can be implemented using software, firmware, hardware (e.g., fixed logic circuitry), manual processing, or any combination thereof. For instance, method 400 can be performed by UE protocol module 108 and/or UE duplication control module 110 of FIG. 1. Alternately or additionally, portions of method 400 can be performed by NE protocol module 114 and/or NE protocol module 116 of FIG. 1. Some operations of the example method may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 400 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At step 402, various implementations establish a radio bearer for communications over a communications network. For example, user equipment can establish the radio bearer to operate in various modes, such as a mode that enables the radio bearer to communicate with multiple serving cells, multiple network entities, and so forth. Alternately or additionally, the radio bearer can operate using carrier aggregation modes of communication. Some network entities establish and/or manage the radio bearer associated with communications between the user equipment and the network entity. Various implementations of the radio bearer include a PDCP protocol entity, and multiple RLC protocol entities, examples of which are provided herein. In some implementations, the PDCP protocol entity and/or the multiple RLC protocol entities are managed by a protocol stack with multiple layers. In carrier aggregation mode, some implementations associate a first RLC protocol entity with a first carrier of multiple carriers and associate a second RLC protocol entity with a second carrier of the multiple carriers.

At step 404, one or more implementations determine whether packet duplication for the radio bearer is enabled. As one example, user equipment can receive various IEs over the communication network, such as ul-DataSplitThreshold, ul-DataSplitDRB-ViaSCG, and/or a Boolean variable, and analyse the IEs to determine state information for packet duplication (e.g., enabled or disabled). This can include extracting and/or analysing the IEs at various levels of the protocol stack, such as the MAC layer and/or a PDCP layer as further described herein. Alternately or additionally, various implementations process MAC control signals to obtain packet duplication state information. It is to be appreciated that ul-DataSplitThreshold, ul-DataSplitDRB-ViaSCG, and the Boolean variable are used here for discussion purposes, and that alternate or additional IEs can extracted, analysed, and/or utilized without departing from the scope of the claimed subject matter. Some implementations support a network entity setting various IEs to enable and/or disable packet duplication to indicate which packet duplication operating mode is the current operating mode, and transmitting the IEs to the user equipment to inform the user equipment of the current operating mode.

In response to determining that packet duplication is enabled, various implantations use in a first operating mode associated with packet duplication at 406. For example, user equipment duplicates uplink PDCP data associated with the PDCP protocol entity over the communications network by submitting a first instance of the uplink PDCP data to a first RLC protocol entity for transmission, and submitting a second instance of the uplink PDCP data to the second RLC entity for transmission. The user equipment continues to use and/or operate in the first operating mode, and the method returns to 404 to evaluate new information as it is received to determine whether to continue using the first mode of operation or whether to use a different mode of operation that is associated with packet duplication. In response to determining that packet duplication is disabled at 404, the method proceeds to 408.

At 408, one or more implementations determine whether a threshold value is set to a predefined value. For instance, various implementations extract ul-DataSplitThreshold using the MAC layer of the UE protocol module, and determine whether the threshold value equates to a predefined value that corresponds to infinity. While described in the context of evaluating ul-DataSplitThreshold, it is to be appreciated that other IEs can be extracted and/or evaluated as well to determine whether the threshold is set to the predefined value. In response to determining the threshold is set to the predefined value, the method proceeds to 410.

Various implementations use a second mode of operation associated with packet duplication at 410. The second mode of operation can include operating in a split bearer mode of operation that uses one of the first RLC protocol entity and the second RLC protocol entity for transmitting the uplink PDCP data over the communications network, and deactivates transmission of the uplink PDCP data over a radio link associated with the other one of the first RLC protocol entity and the second RLC protocol entity which is not used for the uplink PDCP data. As one example, various implementations receive an RRC message that includes an IE associated with transmitting the uplink PDCP data via the split bearer, extracts the IE from the RRC, and uses the IE to configure which RLC protocol entity of the first RLC protocol entity and the second RLC protocol entity to use for transmitting the uplink PDCP data. Alternately or additionally, the second mode of operation flushes a transmission buffer and/or resets transmission state variables for the RLC protocol entity which is not used for the uplink PDCP data. In response to determining that packet duplication has switched from disabled to enabled, various implementations of the second operating mode reactivate the radio link associated with the RLC protocol entity not used for transmitting the uplink PDCP data. Accordingly, the second operating mode can change which RLC protocol entity is used in the split bearer mode. For instance, user equipment can receive control signaling that indicates to switch from the original RLC protocol entity used for transmitting the uplink PDCP data to the other RLC protocol entity not used. In response to the control signal, the user equipment can use the other RLC protocol entity as the newly designated RLC protocol entity for transmitting the uplink PDCP data. In turn and in response to using the newly designated RLC protocol entity, one or more implementations retransmit not yet acknowledged data packets initially designated for transmission on the original RLC protocol entity on the newly designated RLC protocol entity. The not yet acknowledged data packets can be identified in any suitable manner, such as through an RLC status report associated with the original RLC protocol entity. The various implementations continue to use and/or operate in the second operating mode, and the method returns to 404 to evaluate new information as it is received to determine whether to continue using in the second mode of operation or whether to operate in a different mode of operation.

Returning to 408, the method proceeds to 412 in response to determining that the threshold value is set to another value than the predefined value. At 412, one or more implementations operate in a third operating mode associated with packet duplication, where the third operating mode functions a split bearer operating mode. The third operating mode can include accessing radio bearer configuration parameters to determine how to send the uplink PDCP data over the communications network. For example, the uplink PDCP data can be transmitted over the communications network using only the first RLC protocol entity, using only the second RLC protocol entity, or using both of the first RLC protocol entity and the second RLC protocol entity. The various implementations continue to operate in the third operating mode, and the method returns to 404 to evaluate new information as it is received to determine whether to continue using in the third mode of operation or whether to operate in a different mode of operation.

Accordingly, the user equipment and/or network entity can support changing between packet duplication operating modes by communicating information via the communication network, such as first using an operating mode with packet duplication disabled (e.g., in a legacy split-bearer mode) and then using a second operating mode with packet duplication being enabled (e.g. a switching mode of operation that utilizes one link, a packet duplication mode of operation that transmits duplicate data on multiple links, etc.). In response to functioning in an operating mode associated with transmitting duplicate data over a network, various implementations submit a respective instance of the data to each respective RLC protocol entity identified for duplicate data transmission, such as multiple instances of uplink PDCP data, effective to transmit duplicates the same data as further described herein.

Having considered a discussion of using different operating modes associated with packet duplication that can be dynamically changed in accordance with one or more implementations, consider now example computing devices that can implement the various implementations described above.

Example Devices

Figure 5:
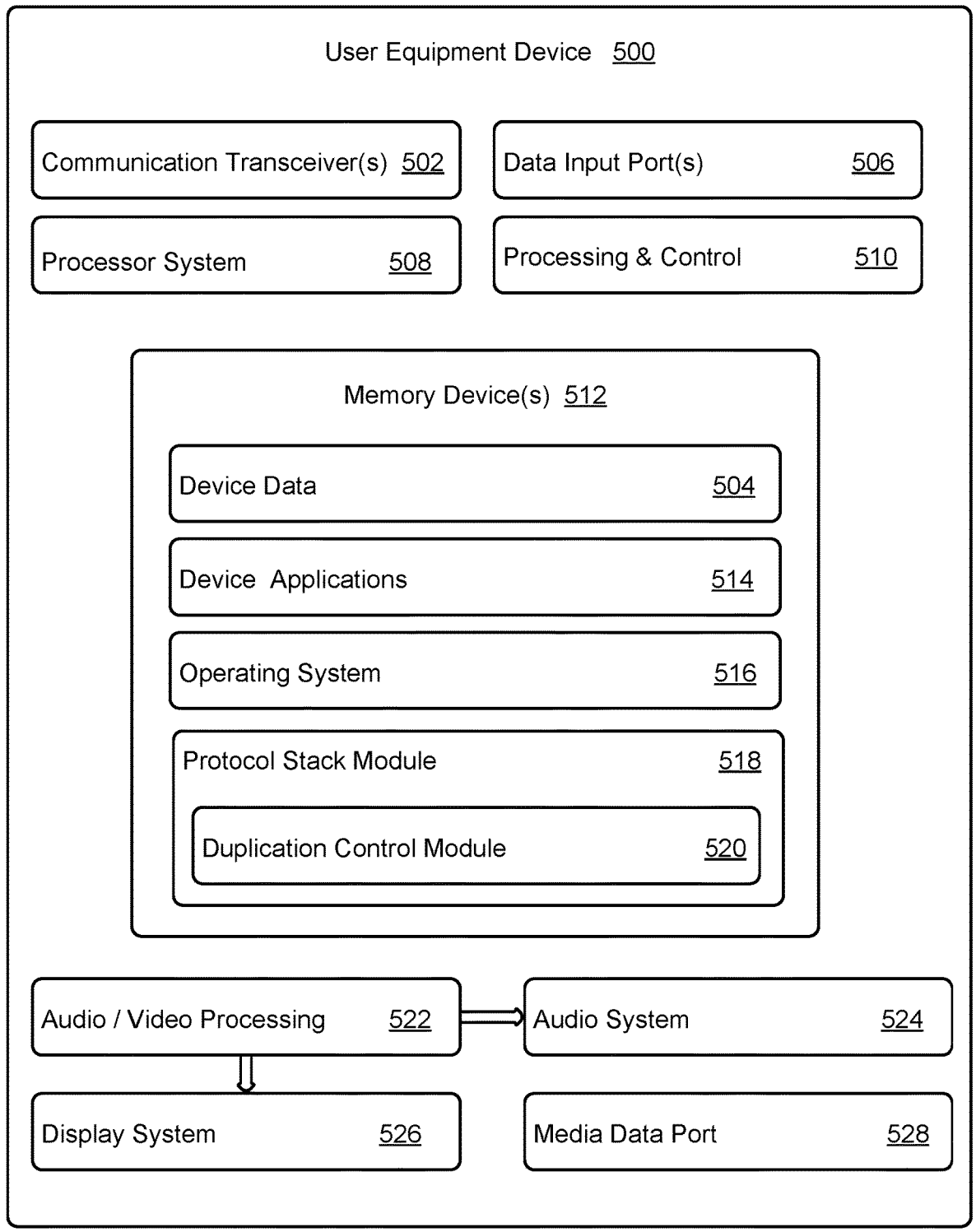
FIG. 5 illustrates various components of an example device that can implement various implementations.
Figure 6:
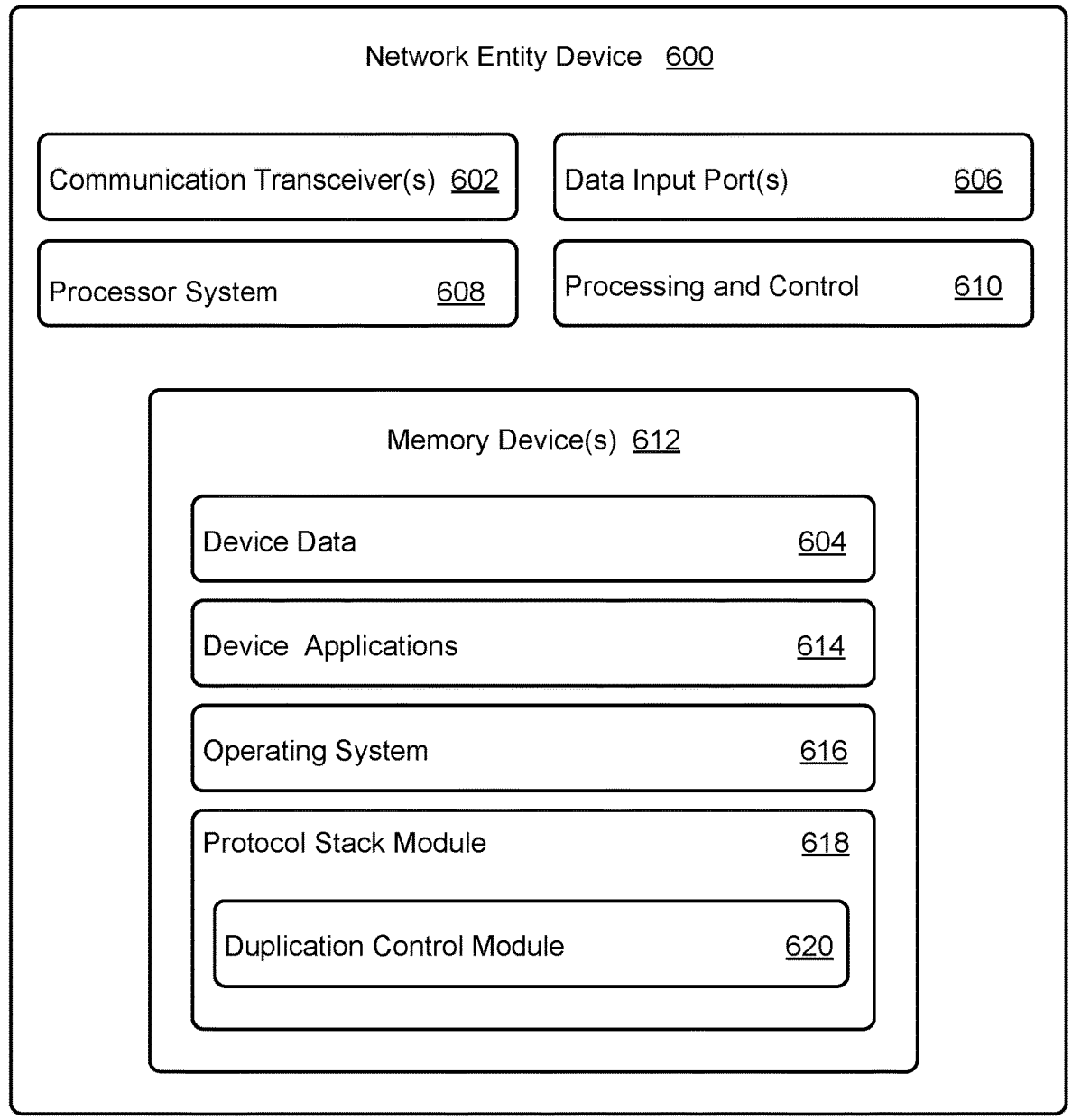
FIG. 6 illustrates various components of an example device that can implement various implementations.

FIG. 5 illustrates various components of an example user equipment device 400 in which selective packet duplication can be implemented, while FIG. 6 illustrates various components of an example network entity device 600 in which user selective packet duplication can be implemented. In some implementations, user equipment device 500 and network entity device 600 have at least some similar components. Accordingly, for the purposes of brevity, FIG. 5 and FIG. 6 will be described together. Similar components associated with FIG. 5 will be identified as components having a naming convention of "5XX", while components associated with FIG. 6 will be identified as components having a naming convention of "6XX". Conversely, components distinct to each device will be described separately. User equipment device 500 and network entity device 600 can be, or include, many different types of devices capable of implementing dynamic connectivity configuration of a wireless networking device and/or user device-initiated connectivity configuration in accordance with one or more implementations.

User equipment device 500/network entity device 600 includes communication transceivers 502/communication transceivers 602 that enable wired or wireless communication of device data 504/device data 604, such as received data and transmitted data. While referred to as a transceiver, it is to be appreciated that communication transceivers 502/communication transceivers 602 can additionally include multiple antennas that can be configured differently from one another, or work in concert to generate beam-formed signals. For example, a first antenna can transmit/receive omnidirectional signals, and subsequent antennas transmit/receive beam-formed signals. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant, 4G-compliant, 5G-compliant), wireless metropolitan area network radios compliant with various IEEE 802.16 (WiMAX™) standards, and wired Local Area Network (LAN) Ethernet transceivers.

User equipment device 500/network entity device 600 may also include one or more data input ports 506/data input ports 606 via which any type of data, media content, and/or inputs can be received, such as user-selectable inputs to the device, messages, music, television content, recorded content, and any other type of audio, video, and/or image data received from any content and/or data source. The data input ports may include Universal Serial Bus (USB ports), coaxial cable ports, and other serial or parallel connectors (including internal connectors) for flash memory, Digital Versatile Discs (DVDs), Compact Discs (CDs), and the like. These data input ports may be used to couple the device to any type of components, peripherals, or accessories such as microphones, cameras, and/or modular attachments.

User equipment device 500/network entity device 600 includes a processing system 508/processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified as processing and control 510/processing and control 610. User equipment device 500/network entity device 600 may further include any type of a system bus or other data and command transfer system that couples the various components within the device. A system bus can include any one or combination of different bus structures and architectures, as well as control and data lines.

User equipment device 500/network entity device 600 also includes computer-readable storage memory or memory devices 512/memory devices 612 that enable data storage, such as data storage devices that can be accessed by a computing device, and that provide persistent storage of data and executable instructions (e.g., software applications, programs, functions, and the like). Examples of the computer-readable storage memory or memory devices 512/memory devices 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. User equipment device 500/network entity device 600 may also include a mass storage media device.

The computer-readable storage memory provides data storage mechanisms to store the device data 504/device data 604, other types of information and/or data, and various device applications 514/device applications 614 (e.g., software applications). For example, an operating system 516/operating system 616 can be maintained as software instructions with a memory device and executed by the processor system 508/processor system 608. The device applications may also include a device manager, such as any form of a control application, software application, signal-processing and control module, code that is native to a particular device, a hardware abstraction layer for a particular device, and so on. User equipment device 500 includes protocol stack module 518 and duplication control module 520, while network entity device 600 includes protocol stack module 618 and duplication control module 620.

Protocol stack module 518/protocol stack module 618 represent functionality that implements any suitable protocol used to communicate between devices. This can include any suitable combination of information, signals, data packets, message ordering, transmission frequencies, modulation types, and/or handshaking used between communication devices to interpret transmitted data and/or to convey information. Some implantations of protocol stack module 518/protocol stack module 618 implement a protocol stack that follows the OSI model as further described herein. Here, protocol stack module 518 includes duplication control module 420, while protocol stack module 618 includes duplication control module 520. While illustrated here as residing within protocol stack module 518/protocol stack module 618, other implementations of duplication control module 520/duplication control module 620 reside outside its respective protocol stack module such that the duplication control module controls various aspects of packet duplication within the corresponding protocol stack. Here, duplication control module 520/duplication control module 620 represent functionality that dynamically and/or selectively enables and disables packet duplication as further described herein User equipment device 500 also includes an audio and/or video processing system 522 that generates audio data for an audio system 524 and/or generates display data for a display system 526.

The audio system 524 and/or the display system 526 may include any devices that process, display, and/or otherwise render audio, video, display, and/or image data. Display data and audio signals can be communicated to an audio component and/or to a display component via an RF link, S-video link, HDMI (high-definition multimedia interface), composite video link, component video link, DVI (digital video interface), analog audio connection, or other similar communication link, such as media data port 528. In implementations, the audio system and/or the display system are integrated components of the example device. Alternatively, the audio system and/or the display system are external, peripheral components to the example device.

CONCLUSION

Various discussions here describe selectively enabling and disabling packet duplication in a wireless network, such as a wireless network that employs Packet Data Convergence Protocol (PDCP). In some aspects, user equipment can dynamically control packet duplication, while in other aspects, a network entity directs the user equipment dynamically enable or disable packet duplication.

One or more implementations provide a computing device comprising: a processor system that implements a protocol module to: establish a radio bearer to communicate with at least one network entity over a communications network, the radio bearer comprising a Packet Data Convergence Protocol (PDCP) protocol entity, a first Radio Link Control (RLC) protocol entity associated with a first radio link over the communications network, and a second RLC protocol entity associated with a second radio link over the communications network; receive, over the communications network, PDCP configuration information that includes a Boolean variable associated with PDCP packet duplication; determine a state of PDCP packet duplication based, at least in part, on the Boolean variable; responsive to determining that the state indicates that PDCP packet duplication is enabled, use a first mode of operation of a plurality of modes of operations associated with PDCP packet duplication using the PDCP protocol entity; and responsive to determining that the state indicates that PDCP packet duplication is enabled, use a second mode of operation of the plurality of modes or a third mode of operation of the plurality of modes by: receiving information over the communications network that includes a threshold value; extracting, using a Medium Access Control (MAC) layer associated with the protocol module, the threshold value from the information; using the second mode of operation in response the MAC layer determining that the threshold value is set to a predefined value associated with the second mode of operation; and using the third mode of operation in response to the MAC layer determining that the threshold value is set to a value other than the predefined value, wherein to use the first mode of operation, the processor system implements the protocol module to: duplicate the uplink PDCP data over the communications network by transmitting a first instance of the uplink PDCP data using the first RLC protocol entity, and transmitting a second instance of the PDCP data using the second RLC protocol entity effective to duplicate the uplink PDCP data, wherein to use the second mode of operation, the processor system implements the protocol module to: use one of the first RLC protocol entity and the second RLC protocol entity for the uplink PDCP data transmissions over the communications network; and deactivate the uplink PDCP data transmissions using the other one of the first RLC protocol entity and the second RLC protocol entity that is not used for the uplink PDCP data transmissions, and wherein to use the third mode of operation, the processor system implements the protocol module to: access radio bearer configuration parameters to determine whether to send the uplink PDCP data: using only the first RLC protocol entity; using only the RLC protocol entity; or using both of the first RLC protocol entity and the second RLC protocol entity.

In one or more implementations, to use the second mode of operation, the processor system implements the protocol module to: receive, via the communications network, a Radio Resource Control (RRC) message that includes an Information Element (IE) associated with transmitting the uplink PDCP data via a split bearer; process the RRC message to extract the IE; and use the IE to configure which RLC protocol entity of the first RLC protocol entity and the second RLC protocol entity to use for said transmitting, over the communications network, the uplink PDCP data via the split bearer.

In one or more implementations, the communications network comprises a Long-Term Evolution (LTE) based network.

In one or more implementations, the computing device comprises a cellular mobile phone.

Although various aspects of dynamically selecting packet duplication have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different implementations are described and it is to be appreciated that each described implementation can be implemented independently or in connection with one or more other described implementations.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method of a user equipment comprising:
    establishing a radio bearer to communicate with at least one network entity, the radio bearer comprising a Packet Data Convergence Protocol ("PDCP') protocol entity associated with a first Radio Link Control ("RLC") protocol entity and with a second RLC protocol entity;
    determining whether PDCP packet duplication associated with the PDCP protocol entity is to be activated;
    communicating with a mobile communication network according to a packet duplication mode of operation in response to determining that PDCP packet duplication is to be activated;
    determining whether a split threshold value of the PDCP protocol entity is set to a predefined value in response to determining that PDCP packet duplication is not to be activated;
    communicating with the mobile communication network according to a first split bearer mode of operation in response to determining that the split threshold value is set to the predefined value; and
    communicating with the mobile communication network according to a second split bearer mode of operation in response to determining that the split threshold value is not set to the predefined value,
    wherein the first split bearer mode of operation comprises:
        selecting one of the first RLC protocol entity and the second RLC protocol entity to be a primary RLC protocol entity; and
        transmitting uplink PDCP data exclusively over a data path associated with the primary RLC protocol entity, wherein the second split bearer mode of operation comprises:
selecting one of the first RLC protocol entity and the second RLC protocol entity to be a primary RLC protocol entity; and
selectively sending uplink PDCP data to the primary RLC protocol entity or to a non-primary RLC protocol entity based on an amount of uplink PDCP data as compared to the split threshold value.

2. The method of claim 1, wherein the predefined value comprises infinity.

3. The method of claim 1, wherein the first RLC protocol entity is associated with a first cell group in the mobile communication network, and wherien the second RLC protocol entity is associated with a second cell group in the mobile communication network.

4. The method of claim 1, wherein selecting the primary RLC protocol entity comprises:
receiving, via the communications network, a Radio Resource Control ("RRC") message that includes an Information Element ("IE") indicating which RLC protocol entity of the first RLC protocol entity and the second RLC protocol entity is to be the primary RLC protocol entity.

5. The method of claim 1, wherein determining whether PDCP packet duplication is to be activated comprises:
receiving, over the communications network, PDCP configuration information that includes a Boolean variable associated with PDCP packet duplication; and
in response to determining the Boolean variable indicates true, determining that PDCP packet duplication is enabled.

6. The method of claim 1, wherein operating in the first split-bearer mode of operation further comprises:
receiving, via the protocol module, one or more control signals that indicate a switch from the one of the first RLC protocol entity and the second RLC protocol entity to the other one of the first RLC protocol entity and the second RLC protocol entity; and
retransmitting, via the protocol module and on the other one of the first RLC protocol entity and the second RLC protocol entity, not yet acknowledged data packets designated for transmission on the one of the first RLC protocol entity and the second RLC protocol entity.

7. The method of claim 1, wherein operating in the second split-bearer mode of operation further comprises:
determining from radio bearer configuration parameters whether to send the uplink PDCP data over the communications network by:
using only the first RLC protocol entity;
using only the second RLC protocol entity; or
using both of the first RLC protocol entity and the second RLC protocol entity.

8. The method of claim 1, further comprising receiving one or more Medium Access Control ("MAC") control signals that indicate PDCP packet duplication state information, wherein determining whether PDCP packet duplication associated with the PDCP protocol entity is enabled comprises using a MAC layer to process the one or more MAC control signals.

9. The method of claim 1, wherein the packet duplication mode of operation comprises duplicating uplink PDCP data by:
submitting a first instance of the uplink PDCP data to the first RLC protocol entity for transmission; and
submitting a second instance of the uplink PDCP data to the second RLC protocol entity for transmission effective to duplicate the uplink PDCP data.

10. The method of claim 9, wherein the packet duplication mode of operation further comprises sending a notification, to the at least one network entity, that indicates a number of RLC retransmissions has reached a maximum number of retransmissions for one of the first RLC protocol entity or the second RLC protocol entity used for said transmitting the duplications of the uplink PDCP data.

11. A user equipment apparatus comprising:
a transceiver that communicates with a mobile communication network via a radio bearer, the radio bearer comprising a Packet Data Convergence Protocol ("PDCP") protocol entity associated with a first Radio Link Control ("RLC") protocol entity and a second RLC protocol entity; and
a processor that:
determines whether PDCP packet duplication associated with the PDCP protocol entity is to be activated;
communicates with a mobile communication network according to a packet duplication mode of operation in response to determining that PDCP packet duplication is to be activated;
determines whether a split threshold value of the PDCP protocol entity is set to a predefined value in response to determining that PDCP packet duplication is not to be activated;
communicates with the mobile communication network according to a first split bearer mode of operation in response to determining that the split threshold value is set to the predefined value; and
communicates with the mobile communication network according to a second split bearer mode of operation in response to determining that the split threshold value is not set to the predefined value,
wherein the first split bearer mode of operation comprises:
selecting one of the first RLC protocol entity and the second RLC protocol entity to be a primary RLC protocol entity; and
transmitting uplink PDCP data exclusively over a data path associated with the primary RLC protocol entity,
wherein the second split bearer mode of operation comprises:
selecting one of the first RLC protocol entity and the second RLC protocol entity to be a primary RLC protocol entity; and
selectively sending uplink PDCP data to the primary RLC protocol entity or to a non-primary RLC protocol entity based on an amount of uplink PDCP data as compared to the split threshold value.

12. The apparatus of claim 11, wherein the predefined value comprises infinity.

13. The apparatus of claim 11, wherein the first RLC protocol entity is associated with a first cell group in the mobile communication network, and wherein the second RLC protocol entity is associated with a second cell group in the mobile communication network.

14. The apparatus of claim 11, wherein selecting the primary RLC protocol entity comprises:
receiving, via the communications network, a Radio Resource Control ("RRC") message that includes an Information Element ("IE") indicating which RLC protocol entity of the first RLC protocol entity and the second RLC protocol entity is to be the primary RLC protocol entity.

15. The apparatus of claim 11, wherein determining whether PDCP packet duplication is to be activated comprises:
  receiving, over the communications network, PDCP configuration information that includes a Boolean variable associated with PDCP packet duplication; and
  in response to determining the Boolean variable indicates true, determining that PDCP packet duplication is enabled.

16. The apparatus of claim 11, wherein operating in the first split-bearer mode of operation further comprises:
  receiving, via the protocol module, one or more control signals that indicate a switch from the one of the first RLC protocol entity and the second RLC protocol entity to the other one of the first RLC protocol entity and the second RLC protocol entity; and
  retransmitting, via the protocol module and on the other one of the first RLC protocol entity and the second RLC protocol entity, not yet acknowledged data packets designated for transmission on the one of the first RLC protocol entity and the second RLC protocol entity.

17. The apparatus of claim 11, wherein operating in the second split-bearer mode of operation further comprises:
  determining from radio bearer configuration parameters whether to send the uplink PDCP data over the communications network by:
    using only the first RLC protocol entity;
    using only the second RLC protocol entity; or
    using both of the first RLC protocol entity and the second RLC protocol entity.

18. The apparatus of claim 11, further comprising receiving one or more Medium Access Control ("MAC") control signals that indicate PDCP packet duplication state information, wherein determining whether PDCP packet duplication associated with the PDCP protocol entity is enabled comprises using a MAC layer to process the one or more MAC control signals.

19. The apparatus of claim 11, wherein the packet duplication mode of operation comprises duplicating uplink PDCP data by:
  submitting a first instance of the uplink PDCP data to the first RLC protocol entity for transmission; and
  submitting a second instance of the uplink PDCP data to the second RLC protocol entity for transmission effective to duplicate the uplink PDCP data.

20. The apparatus of claim 19, wherein the packet duplication mode of operation further comprises sending a notification, to the at least one network entity, that indicates a number of RLC retransmissions has reached a maximum number of retransmissions for one of the first RLC protocol entity or the second RLC protocol entity used for said transmitting the duplications of the uplink PDCP data.

* * * * *